United States Patent Office 3,563,893
Patented Feb. 16, 1971

3,563,893
CHEMICAL COMPOSITION
George L. Doelling, St. Louis, Mo., and James E. Peskar, Cahokia, and Joseph A. Siefker, Quincy, Ill., assignors to Wager Electric Corporation, Newark, N.J., a corporation of Delaware
No Drawing. Filed Jan. 8, 1968, Ser. No. 696,120
Int. Cl. C09k 3/00
U.S. Cl. 252—73                                          9 Claims

ABSTRACT OF THE DISCLOSURE

Acetals are prepared by reacting methoxyacetaldehyde with tetrahydrofurfuryl alcohol or with mono lower alkyl ethers of mono, di or tri ethylene or propylene glycols. These acetals have value as essential ingredients in hydraulic brake fluids of the non-mineral oil type, since they enable such fluids to better meet mandatory specifications covering the performance and use thereof.

---

This invention relates to novel compositions of matter comprising acetals derived from methoxyacetaldehyde and to the use thereof as beneficial essential ingredients in hydraulic brake fluids of the non-mineral oil type.

Modern hydraulic brake fluids are required to meet stringent specifications established by both governmental and nongovernmental agencies, viz. the laws of the United States and various specific states, and the specifications of the Society of Automotive Engineers, such as SAE Specification J70C and especially the sections thereof entitled "Heavy Duty Type (SAE 70R1 and 70R1 ARCTIC)" and "Heavy Duty Type (SAE 70R3)." In general, the brake fluids must be capable of withstanding high temperatures encountered in operation of modern automobiles and other automotive vehicles at sustained high speeds, and these requirements are becoming more accentuated with the ever increasing use of disc brakes. In order to meet such high temperature requirements, hydraulic brake fluids of the nonmineral oil type are often compounded so as to have boiling points of 400° to 500° F. or even higher. However, such high boiling brake fluids frequently raise a problem of meeting the low temperature requirements set forth in the aforementioned SAE specifications, particularly the cold tests at −40° F. and −58° F. as well as the limitation that the viscosity should not exceed 1800 centistokes at −40° F. Furthermore, high boiling hydraulic brake fluids often include ingredients which produce an adverse effect upon rubber cups and other rubber parts used in the brake system, such as swelling, softening or plasticization of the rubber, and these effects may make the fluids unacceptable under the aforementioned SAE specifications.

It has now been discovered that hydraulic brake fluids of the non-mineral oil type can be considerably improved if certain acetals derived from methoxyacetaldehyde are included in the fluid as an essential ingredient. More specifically, brake fluids improved in accordance with the invention have excellent high temperature performance capabilities and also satisfy all of the low temperature requirements, and restrictions against adverse effect upon rubber, set forth in the aforementioned SAE specifications. Therefore, brake fluids formulated in accordance with this invention may be used over wide extremes of operating conditions encountered in brake systems of automobiles, trucks, buses, military vehicles and in industrial brakes such as crane brakes, etc.

The novel acetals provided by this invention are formed by reacting methoxyacetaldehyde with tetrahydrofurfuryl alcohol or with mono lower alkyl ethers of mono, di or tri ethylene or propylene glycols. These novel acetals are, in general, clear liquids which boil at temperatures well over 400° F. at atmospheric pressures and have structures represented by the following formula:

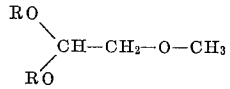

wherein R is one of:

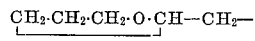

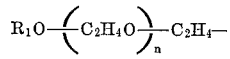

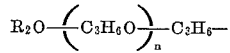

and $R_1$ and $R_2$ are aliphatic hydrocarbon radicals having up to four carbon atoms, and $n$ is an integer from 0 to 2 inclusive.

The foregoing novel class of acetals provided by the invention includes the specific acetal formed by reacting methoxyacetaldehyde with tetrahydrofurfuryl alcohol having the following formula:

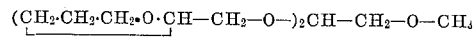

The class further includes acetals formed by reacting methoxyacetaldehyde with mono alkyl ethers of mono, di or tri ethylene glycol having the formula:

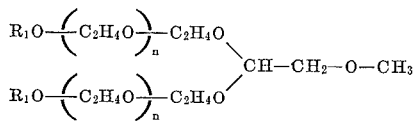

in which $R_1$ is an aliphatic hydrocarbon radical having up to four carbon atoms and $n$ is an integer from 0 to 2. Accordingly, when $n$ is zero in the above formula, as when mono alkyl ethers of monoethylene glycol are employed, methoxyacetaldehyde di(alkoxyethyl) acetals are formed; when $n$ is 1 in the above formula, as when mono alkyl ethers of diethylene glycol are employed, methoxyacetaldehyde di(alkoxyethoxyethyl) acetals are formed; and when $n$ is 2 in the above formula, as when mono alkyl ethers of triethylene glycol are employed, methoxyacetaldehyde di(alkoxydiethoxyethyl) acetals are formed.

The class of acetals provided by the invention further includes acetals formed by reacting methoxyacetaldehyde with mono alkyl ethers of mono, di or tri propylene glycols having the following formula:

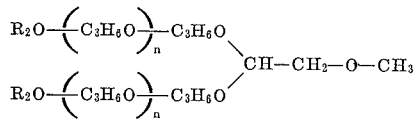

wherein $R_2$ is an aliphatic hydrocarbon radical having up to four carbon atoms and $n$ is an integer from 0 to 2. Accordingly, when $n$ is zero in the above formula, as when mono alkyl ethers of monopropylene glycol are employed, methoxyacetaldehyde di(alkoxypropyl) acetals are formed; when $n$ is 1 in the above formula, as when mono alkyl ethers of dipropylene glycol are employed, methoxyacetaldehyde di(alkoxypropoxypropyl) acetals are formed; and when $n$ is 2 in the above formula, as when mono alkyl ethers of tripropylene glycol are employed, methoxyacetaldehyde di(alkoxydipropoxypropyl) acetals are formed. All of the propylene glycol ethers described above may be derived from 1,2-propanediol or from the isomer 1,3-propanediol for use in preparation of acetals within the scope of this invention.

In forming the above described acetals of methoxyacetaldehyde, conventional preparation methods can be used. Thus, each 1 mol of methoxyacetaldehyde is reacted with at least 2 mols, and preferably with a small excess, of the particular alcohol ingredient selected from the total useful group comprising tetrahydrofurfuryl alcohol and mono lower alkyl esters of mono, di or tri ethylene or propylene glycols. The reaction is carried out at elevated temperatures in the presence of a catalyst which may be an acid such as hydrochloric or p-toluene sulfonic acid or the catalyst may be boron trifluoride-ethyl ether complex as is known in the art. In general, the reaction temperatures may vary from about 190° F. to about 250° F. in order to form the acetal product at a reasonably rapid rate. The reactants may be dissolved in a suitable solvent, for example, benzene or other organic solvents, and both the solvent and the water formed during the course of the reaction, as the same evaporate from the reaction mixture, may be trapped and collected by a reflux condenser.

In using the acetals of the invention in hydraulic brake fluids, the acetal may comprise a minor ingredient or the major ingredient as compared to other conventional ingredients that are used in brake fluids of the non-mineral oil type. Accordingly, the acetals of the invention may comprise, per 100 parts by volume of the hydraulic brake fluid, from about 30 to about 80 parts by volume. The brake fluid may also include a lubricant ingredient such as polypropylene glycol, mixtures of polypropylene and polyethylene glycols, or lower alkyl ethers of the same, preferably having a molecular weight of 400 or more. The quantity of the lubricant ingredient, per 100 parts by volume of the brake fluid, may vary from 0 to 30 parts by volume. The brake fluids formed in accordance with the invention may also include, as a diluent, extender or carrier, a lower alkyl ether of polyethylene glycol with the alkyl group containing up to about four carbon atoms. This ingredient may be used in the proportion of 10 to 65 parts by volume per 100 parts by volume of the total fluid. Other conventional ingredients such as buffering agents, rubber swell inhibitors and antioxidants may be included. For example, in order to maintain the pH of the fluid in the range from 7.0 to 11.5, as is required in some of the earlier mentioned SAE specifications, metal soaps such as potassium ricinoleate, amines, borax or borax compounds combined with glycols may be employed. As rubber swell inhibitors, mono, di or tri propylene glycol or tri or tetraethylene glycol can be employed. Conventional antioxidants such as diphenylolpropane (Bisphenol A), tetramethyl diamino diphenyl methane, trimethyl di hydroquinoline polymer, and other products can be used. The buffering agents, rubber swell inhibitors and antioxidants will be used in small effective concentrations generally ranging from about 3 to about 15 parts by volume per 100 parts by volume of the brake fluid.

The invention will be further illustrated by the following examples which represent several embodiments thereof.

EXAMPLE 1

Methoxyacetaldehyde di(methoxydiethoxyethyl) acetal was made by reacting each 1 mol of methoxy acetaldehyde with slightly more than 2 mole of the monomethyl ether of triethylene glycol. The reactants were dissolved in benzene together with a catalyst comprising boron fluoride-ethyl ether complex and reaction was carried out under reflux at temperatures from about 200° to 240° F. The resulting acetal was a liquid with a specific gravity at 20°/20° C. of 1.08, a viscosity at 20° C. of about 15 centistokes, a viscosity at —40° F. of about 1700 centistokes, a reflux boiling point of 579° F., and it did not freeze up after 16 hours at —58° F. The rubber-swelling was about .021 inch gain in base diameter of a standard 1⅛ inch natural rubber wheel cylinder cup after four days at 158° F. (mixed with an equal volume of castor oil). The acetal had the following formula:

(CH₃OC₂H₄OC₂H₄OC₂H₄O—)₂CH—CH₂—O—CH₃
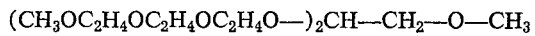

EXAMPLE 2

Methoxyacetaldehyde di(triethoxyethyl) acetal was made, as in Example 1, by reacting methoxyacetaldehyde with the monoethyl ether of triethylene glycol. This acetal was a liquid with a specific gravity at 20°/20° C. of about 1.05, a viscosity at 20° C. of about 15 centistokes, a boiling point at about 2 mm. pressure of about 390° F. It did not freeze up after two days at —40° F., and the rubber swelling at 158° F. on a natural rubber 1⅛ inch cup was .028 inch gain in base diameter (50–50 castor oil). The acetal had the following formula:

(C₂H₄OC₂H₄OC₂H₄OC₂H₄O—)₂CH—CH₂—O—CH₃

EXAMPLE 3

Methoxyacetaldehyde di(methoxyethoxyethyl) acetal was made in the manner described in Example 1 by reacting methoxyacetaldehyde and the monomethyl ether of diethylene glycol.

This acetal was a liquid that did not freeze up after 16 hours at —58° F. It had a boiling point at about 2 mm. pressure of about 310° F., a specific gravity at 20°/20° C. of about 1.06 and a viscosity at 20° C. of about 7 centistokes. The acetal had the following formula:

(CH₃OC₂H₄OC₂H₄O—)₂CH—CH₂—O—CH₃
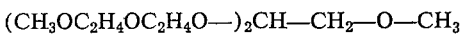

EXAMPLE 4

Methoxyacetaldehyde di(tetrahydrofurfuryl) acetal was made in the manner described in Example 1 by reacting methoxyacetaldehyde with tetrahydrofurfuryl alcohol.

This acetal was a liquid with a specific gravity at 20°/20° C. of about 1.09, a viscosity at 20° C. of about 14 centistokes, and a boiling point at atmospheric pressure of about 590° F. It swells at 1⅛ inch natural rubber cup about .050 inch after 24 hours at 150° F. (50-50 with castor oil). It did not freeze up after several hours at —58° F. The acetal had the following formula.

(CH₂·CH₂·CH₂·O·CH₂—O—)₂CH—CH₂—O—CH₃
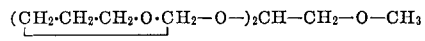

EXAMPLE 5

Methoxyacetaldehyde di(methoxyethyl) acetal was made in the manner described in Example 1 by reacting methoxyacetaldehyde and the monomethyl ether of ethylene glycol.

This acetal was a liquid with a specific gravity of about 1.022 at 20°/20° C., and a viscosity of about 2.8 centistokes at 20° C. It had a boiling point of about 460° F. It did not freeze up after several hours at —58° F. The acetal had the following formula:

(CH₃OC₂H₄O—)₂CH—CH₂—O—CH₃
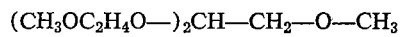

EXAMPLE 6

Methoxyacetaldehyde di(methoxypropyl) acetal was made in the manner described in Example 1 by reacting methoxyacetaldehyde and the monomethyl ether of propylene glycol. This acetal was a liquid with a specific gravity of 1.088 at 20°/20° C., and a viscosity at 20° C. of 31.9 centistokes. It did not freeze up after 16 hours at —40° F. The acetal had the following formula:

(CH₃OC₃H₆O—)₂CH—CH₂—O—CH₃

EXAMPLE 7

A hydraulic fluid was made using the acetal of Example 1 as an ingredient. This fluid had the following composition for approximately 100 cc. of fluid:

40 cc. of methoxyacetaldehyde di(methoxydiethoxyethyl) acetal.
34 cc. of triethylene glycol mono ethyl ether.
5 cc. of dipropylene glycol.
20 cc. of polypropylene glycol (molecular weight of 1025).
0.3 gram of tetramethyl diaminodiphenyl methane.
0.7 gram of potassium ricinoleate.

This hydraulic fluid had properties approximately as follows:

Appearance _____ A clear liquid.
Specific gravity at 20°/20° C. _____ 1.043.
Viscosity at 20° C. _____ 18.10 centistokes.
Viscosity at −40° F. _____ 1705 centistokes.
Rubber-swelling, 1⅛ inch natural
  rubber cup, 3 days at 158° F. _____ .018 inch.

EXAMPLE 8

Another hydraulic fluid was made using the acetal of Example 3 as an ingredient as follows:

60 cc. of methoxyacetaldehyde di(methoxyethoxyethyl) acetal.
21.6 cc. of triethylene glycol monomethyl ether.
8.0 cc. of dipropylene glycol.
10.0 cc. of polypropylene glycol (molecular weight of 2000).
0.2 cc. of triethanolamine.
0.2 grams of trimethyl dihydroquinoline polymer.

This hydraulic fluid had properties approximately as follows:

Appearance _____ A clear liquid.
Specific gravity at 20°/20° C. _____ 1.051.
Viscosity at 20° C. _____ 12.6 centistokes.
Viscosity at −40° F. _____ 707 centistokes.
Boiling point, SAE _____ 510° F.
Rubber swelling, 1⅛ inch natural
  rubber cup, 3 days at 158° F. _____ .022 inch.

EXAMPLE 9

A hydraulic fluid was made using the acetal of Example 4 as an ingredient. This fluid had the following composition for approximately 100 cc. of fluid:

35 cc. of methoxyacetaldehyde di(tetrahydrofurfuryl) acetal.
46 cc. of triethylene glycol monomethyl ether.
12 cc. of monobutyl ether of 1,2 oxyethylene, 1,2 oxypropylene glycols of viscosity of 260 Saybolt seconds at 100° F.
6 cc. of dipropylene glycol.
0.5 gram of potassium ricinoleate.
0.5 gram of diphenylol propane.

This hydraulic fluid had properties approximately as follows:

Appearance _____ A clear liquid.
Specific gravity at 20°/20° C. _____ 1.063.
Viscosity at 20° C. _____ 17.06 centistokes.
Viscosity at −40° F. _____ 1242 centistokes.
Rubber swelling, 1⅛ inch natural
  rubber cup, 3 days at 158° F. _____ .039 inch.

EXAMPLE 10

A hydraulic fluid was made using the acetals of Example 1 and Example 5 as ingredients. This fluid had the following composition for approximately 100 c. of fluid:

30 cc. of methoxyacetaldehyde di(methoxydiethoxyethyl) acetal.
10 cc. of methoxyacetaldehyde di(methoxyethyl) acetal.
34 cc. of triethylene glycol monoethyl ether.
20 cc. of polypropylene glycol (molecular weight of 1025).
5 cc. of dipropylene glycol.
0.3 gram of tetramethyl diaminodiphenyl methane.
0.7 gram of potassium ricinoleate.

This hydraulic fluid had properties approximately as follows:

Appearance _____ A clear fluid.
Specific gravity at 20°/20° C. _____ 1.037.
Viscosity at 20° C. _____ 16.28 centistokes.
Viscosity at −40° F. _____ 1190 centistokes.
pH, SAE _____ 8.80.
Rubber swelling, 1⅛ inch natural
  rubber cup, 24 hours at 158° F. ____ .024 inch.

This Example 10 illustrates the viscosity-reducing value of the methoxyacetaldehyde di(methoxyethyl) acetal as 10% of this in Example 10 reduced the viscosity at −40° F. to 1190 centistokes, from the 1705 centistokes in Example 7. In other respects Example 10 is the same composition as Example 7.

EXAMPLE 11

A hydraulic fluid was made using the acetal of Example 1 as an ingredient, as follows:

65 cc. of methoxyacetaldehyde di(methoxydiethoxyethyl) acetal.
20 cc. of triethylene glycol monobutyl ether.
15 cc. of tetraethylene glycol.
About 0.4 gram of potassium ricinoleate.

This fluid had properties approximately as follows:

Appearance _____ A clear fluid.
Specific gravity at 20°/20° C. _____ 1.069.
Viscosity at 20° C. _____ 16.85 centistokes.
Viscosity at −40° F. _____ 1392 centistokes.
Boiling point, SAE _____ 591° F.
Rubber swelling, SBR 1⅛ inch cup 2
  days at 248° F. _____ .053 inch.

The brake fluid properties recited in the above examples were measured in accordance with the procedures set forth in the earlier mentioned SAE specifications.

It will be understood that it is intended to cover all changes and modifications of the preferred embodiments of the invention, herein chosen for the purpose of illustration, which do not constitute departures from the spirit and scope of the invention.

What is claimed is:

1. A hydraulic fluid especially adapted for use in a hydraulic brake system comprising in 100 parts thereof from about 0 to about 30 parts of a lubricant selected from the group consisting of polypropylene glycol, polyethylene glycol, mixtures of polypropylene and polyethylene glycols, and lower alkyl ethers of polypropylene and polyethylene glycol, from about 10 to about 65 parts of a diluent selected from the group consisting of the lower alkyl ethers of polyethyleneglycol wherein the alkyl group contains up to about 4 carbon atoms, and from about 30 to about 80 parts of an acetal having the formula:

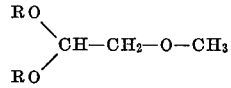

wherein R is one of:

$CH_2 \cdot CH_2 \cdot CH_2 \cdot O \cdot CH—CH_2—$

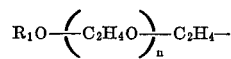

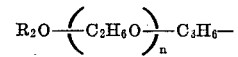

and $R_1$ and $R_2$ are aliphatic hydrocarbon radicals each having up to four carbon atoms, and $n$ is an integer from 0 to 2.

2. The hydraulic brake fluid of claim 1 wherein said acetal has the formula:

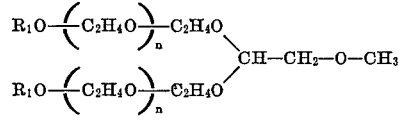

$R_1$ and $n$ being as defined in claim 1.

3. The hydraulic brake fluid of claim 1 wherein said acetal has the formula:

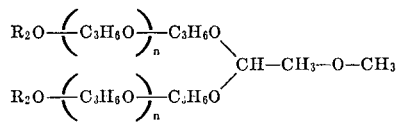

R$_2$ and $n$ being as defined in claim 1.

4. The hydraulic brake fluid of claim 1 wherein said acetal is methoxyacetaldehyde di(tetrahydrofurfuryl) acetal having are formula:

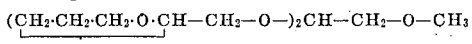

5. The hydraulic brake fluid of claim 1 wherein said acetal is methoxyacetaldehyde di(methoxydiethoxyethyl) acetal having the formula:

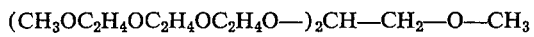

6. The hydraulic brake fluid of claim 1 wherein said acetal is methoxyacetaldehyde di(triethoxyethyl) acetal having the formula:

7. The hydraulic brake fluid of claim 1 wherein said acetal is methoxyacetaldehyde di(methoxyethyl) acetal having the formula:

8. The hydraulic brake fluid of claim 1 wherein said acetal is methoxyacetaldehyde di(methoxypropyl) acetal having the formula:

9. A brake fluid according to claim 1 which further includes from about 3 to about 15 parts by volume of mono, di, or tri propylene glycol, or tri or tetra ethylene glycol.

References Cited
UNITED STATES PATENTS

| | | | |
|---|---|---|---|
| 2,786,081 | 3/1957 | Kress | 260—615 |
| 3,436,427 | 4/1969 | Cavitt | 260—615 |

LEON D. ROSDOL, Primary Examiner

D. SILVERSTEIN, Assistant Examiner

U.S. Cl. X.R.

252—52, 74, 75, 77

PO-1050
(5/69)

UNITED STATES PATENT OFFICE
CERTIFICATE OF CORRECTION

Patent No. 3,563,893     Dated February 16, 1971

Inventor(s) George L. Doelling; James E. Peskar; & Joseph A.S:

It is certified that error appears in the above-identified patent and that said Letters Patent are hereby corrected as shown below:

Assignee should read --Wagner Electric Corporation--

Col. 4, Line 34: "It swells at 1-1/8 inch" should read
--It swells a 1-1/8 inch--

Col. 4, Line 39: The formula should read
--$(CH_2.CH_2.CH_2.O.CH-CH_2-O)$ etc.--

Col. 6, Line 61 - Claim 1: The formula should read
--$R_2O+(C_3H_6O)_n C_3H_6-$ --

Col. 7, Line 11 - Claim 4: "are formula" should read
--the formula--

Col. 7, Line 24 - Claim 6: The formula should read
--$(C_2H_4OC_2H_4OC_2H_4OC_2H_4O-)$ etc.--

Col. 8, Line 3 - Claim 7: The formula should read
--$(CH_3OC_2H_4O-)$ etc.--

Col. 8, Line 8 - Claim 8: The formula should read
--$(CH_3OC_3H_6O-)$ etc. --

Signed and sealed this 7th day of September 1971.

(SEAL)
Attest:

EDWARD M. FLETCHER, JR.
Attesting Officer

ROBERT GOTTSCHALK
Acting Commissioner of Pate